US009505339B2

(12) United States Patent
Ehlgen et al.

(10) Patent No.: US 9,505,339 B2
(45) Date of Patent: Nov. 29, 2016

(54) METHOD AND CONTROL UNIT FOR ACTIVATING AT LEAST ONE HEADLIGHT OF A VEHICLE USING A TRAFFIC DENSITY

(75) Inventors: Tobias Ehlgen, Ravensburg (DE); Stefan Nordbruch, Kornwestheim (DE); Johannes Foltin, Ditzingen (DE); Robert Meisner, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 182 days.

(21) Appl. No.: 14/125,646

(22) PCT Filed: May 21, 2012

(86) PCT No.: PCT/EP2012/059343
§ 371 (c)(1),
(2), (4) Date: Jun. 13, 2014

(87) PCT Pub. No.: WO2012/171749
PCT Pub. Date: Dec. 20, 2012

(65) Prior Publication Data
US 2014/0334168 A1    Nov. 13, 2014

(30) Foreign Application Priority Data

Jun. 16, 2011    (DE) .................. 10 2011 077 610

(51) Int. Cl.
*B60Q 1/08* (2006.01)
*B60Q 1/14* (2006.01)

(52) U.S. Cl.
CPC ............... *B60Q 1/08* (2013.01); *B60Q 1/085* (2013.01); *B60Q 1/143* (2013.01); *B60Q 2300/322* (2013.01); *B60Q 2300/33* (2013.01)

(58) Field of Classification Search
CPC  B60Q 1/08; B60Q 1/143; B60Q 2300/0052; B60Q 2300/054
See application file for complete search history.

(56) References Cited

U.S. PATENT DOCUMENTS

| 2003/0123705 A1* | 7/2003 | Stam ............... B60Q 1/085 382/104 |
| 2006/0267502 A1* | 11/2006 | Kubota ............. B60Q 1/143 315/82 |
| 2013/0177202 A1 | 7/2013 | Dierks et al. | |

FOREIGN PATENT DOCUMENTS

| DE | 36 01 388 | 7/1987 |
| DE | 197 565 74 | 10/1997 |
| DE | 10 133 283 | 1/2003 |
| DE | 10 2005 033 841 | 12/2006 |

(Continued)

OTHER PUBLICATIONS

Machine translation of DE 10 2005 033841, retrieved Oct. 28, 2015.*

(Continued)

*Primary Examiner* — Anh Mai
*Assistant Examiner* — Steven Horikoshi
(74) *Attorney, Agent, or Firm* — Norton Rose Fulbright US LLP; Gerard Messina

(57) ABSTRACT

A method for activating at least one headlight of a vehicle has: a step of ascertaining a traffic density from an item of information about road users in the surroundings of the vehicle; a step of determining a control parameter for controlling an emission characteristic of the headlight using the ascertained traffic density; and a step of providing the control command for controlling an emission characteristic of the headlight using the control parameter.

7 Claims, 2 Drawing Sheets

(56) References Cited

FOREIGN PATENT DOCUMENTS

| DE | 197 58 667 | 7/2007 |
|---|---|---|
| DE | 10 2008 001963 | 12/2009 |
| DE | 10 2009 024129 | 12/2010 |
| DE | 10 2009 028342 | 2/2011 |
| DE | 10 2009 054 249 | 5/2011 |
| DE | 10 2009 054228 | 5/2011 |
| DE | 102009054227 | 5/2011 |
| EP | 2 119 593 | 11/2009 |
| EP | 2 289 737 | 3/2011 |
| FR | 2 947 223 | 12/2010 |

OTHER PUBLICATIONS

International Search Report for PCT/EP2012/055060, dated Jul. 27, 2012.

* cited by examiner

METHOD AND CONTROL UNIT FOR ACTIVATING AT LEAST ONE HEADLIGHT OF A VEHICLE USING A TRAFFIC DENSITY

BACKGROUND OF THE INVENTION

1. Field of the Invention

The present invention relates to a method for activating at least one headlight of a vehicle, a control unit for activating at least one headlight of a vehicle, and a corresponding computer program product.

2. Description of the Related Art

In a conventional lighting system of a vehicle, it is possible to change between two different light patterns of the main headlights. While the high beams emit a light cone which may illuminate a road over a large distance ahead of the vehicle, the low beams have a sharp bright-dark boundary, so as not to dazzle other road users. However, a light range of the low beams is thus restricted. If another road user may be dazzled by the high beams, a driver of the vehicle should activate the low beams. After the other road user may no longer be dazzled, the driver should activate the high beams again. However, the activation frequently occurs too late or not at all. The driver thus endangers himself and other occupants of the vehicle, since a visibility range of the driver is too low using low beams for common speeds outside built-up areas.

Published German patent application document DE 10 2009 028 342 A1 describes a method for determining whether a region is illuminated. The method analyzes image data of a camera. The region is evaluated as illuminated if at least two stationary streetlight units are recognized on the basis of the image data and if these streetlight units have a spatial distance from one another.

BRIEF SUMMARY OF THE INVENTION

The present invention is based on the finding that, for example, a high-beam mode or another mode for emitting light at a high emission angle from headlights of a vehicle may be reactivated by a control unit if other road users may no longer be dazzled. For this purpose, the control unit may take into consideration how probable it is that a new road user will appear in a short interval after the disappearance of the last road user. The probability may influence a holding time, of how rapidly the high beams are switched on again, after another vehicle has exited from an illumination range of the main headlights. Alternatively or additionally, a speed for a change of the emission characteristic may also be changed as a function of the probability. For the probability, more generalized traffic on the traveled road, for example, in the form of a detected traffic density, i.e., for example, the number of vehicles which travel on a road section, may be taken into consideration. If a large amount of traffic is detected, the probability of dazzling another road user is high and the holding time may be longer or the speed of the change of the emission characteristic may be greater. If little traffic is detected, the probability of dazzling the other road user is low and the holding time may be shorter. Expressed more generally, a control parameter for controlling an emission characteristic of the headlight may be determined in response to the ascertained traffic density. The control command may then be provided to control an emission characteristic of the headlight using the control parameter. The fact may be utilized that, for example, via the adaptation of at least one control parameter, a dynamic response setting is possible, i.e., a setting of the speed of the change of the illumination characteristic of the headlights. This is reasonable in particular in the case of adaptive high-beam assistants such as AHC (i.e., a floating transition between low beams and high beams) and CHC (i.e., dazzle-free high beams). For example, a dynamic response may be decreased (i.e., a speed of the change of the emission characteristic of the headlight may be reduced), if the traffic density is high.

The present invention provides a method for activating at least one headlight of a vehicle, having the following steps:
ascertaining a traffic density from an item of information about road users in the surroundings of the vehicle;
determining a control parameter for controlling an emission characteristic of the headlight, while using the ascertained traffic density; and
providing a control command for controlling an emission characteristic of the headlight while using the control parameter.

Furthermore, the present invention provides a control unit for activating at least one headlight of a vehicle, the control unit having the following features:
a unit for ascertaining a traffic density from an item of information about road users in the surroundings of the vehicle;
a unit for determining a control parameter for controlling an emission characteristic of the headlight, while using the ascertained traffic density; and
a unit for providing a control command for controlling an emission characteristic of the headlight while using the control parameter.

The object on which the present invention is based may also be achieved rapidly and efficiently by this embodiment variant of the present invention in the form of a control unit.

In particular, according to one specific embodiment of the present invention, in the step of determining, a delay time is determined as a control parameter while using the traffic density, the delay time representing a time span, by which a control command for the headlight is delayed when a foreign vehicle has left an illumination range of the emission characteristic of the headlight, in particular the delay time increases when the traffic density increases, and, in the step of providing, the control command is provided in response to leaving of the illumination range by the foreign vehicle after waiting out the delay time.

The surroundings of a vehicle may be understood, for example, as a region of predetermined size around the vehicle or a road presently traveled by the vehicle. The surroundings may also include roads and streets which intersect the road or branch off from the road. Road users may be, for example, pedestrians, bicyclists, motorcyclists, or drivers of foreign vehicles. The information may be, for example, an item of distance information between each two road users. The information may also be a position of each road user. For example, the information may also be a usage frequency of a road section. The information may also be an estimation based on experience values. A traffic density may be a number of vehicles in the predefined surroundings of the host vehicle (in relation to a road section, distance, or time interval), so that the traffic density may implicitly represent a probability that a road user will enter or travel a dazzling-endangered area ahead of the vehicle. An illumination range of a headlight may be a range which may be illuminated by a light bundle of the headlight with a greater brightness than a dazzling brightness. An emission characteristic may be a predefined headlight setting, for example, high beams, low beams, cornering light, or intersection light, or an intermediate stage of the above-mentioned types of light or any arbitrary other light emission characteristic. For example, the emission characteristic may alternatively or additionally represent a specific brightness or brightness distribution in the form of an illumination pattern, a specific high-beam level, a predefined movement of the area illuminated by the headlights, or another parameter, which represents an item of information about a type of the light emission by the headlight or headlights. A control command may change a control signal from a first value to a second value, for example.

A control unit may be understood in the present case as an electrical device, which processes sensor signals and outputs control signals as a function thereof. The control unit may have an interface, which may be designed in hardware and/or software. In the case of a hardware design, the interfaces may be part of a so-called system ASIC, for example, which includes greatly varying functions of the control unit. However, it is also possible that the interfaces are separate integrated circuits or are composed at least partially of discrete components. In the case of a software design, the interfaces may be software modules, which are provided on a microcontroller in addition to other software modules, for example.

According to one advantageous specific embodiment of the present invention, in the step of determination, a speed of a change of the emission characteristic may be determined as a control parameter, in particular the speed of the change of the emission characteristic being reduced if the traffic density increases. Such a specific embodiment of the present invention offers the advantage of very simple automatic setting of the dynamic response of the change of the emission characteristic of the at least one headlight to increase the comfort for the driver.

The control command may control a change from a first emission characteristic of the headlight to at least one second emission characteristic of the headlight. For example, the control command may cause the headlights to change from low beams (for example, continuously) to high beams or vice versa. The different emission characteristics may have different dazzling effects. The emission characteristics of (adaptive) light assistants, which have entirely different light distributions, may also be taken into consideration in this case. Examples of such light assistants would be, for example, an assistant for expressway light, city light, or AHC (adaptive high-beam control, i.e., a control for a [quasi-] continuous adaptation of the light distribution between low beams and high beams, which is related to light range regulation).

The information may be ascertained using data of at least one external sensor. An external sensor may be understood, for example, as an infrastructure sensor, such as a sensor in a lane of the road or a sensor on a bridge or a traffic light. The sensors may have different active principles. The data of the external sensors may be combined to form data services and may be received wirelessly in the vehicle. By way of external sensors, the traffic density may be ascertained predictively, also if the vehicle has not yet reached a sensor location.

Furthermore, the information may be ascertained using data of at least one vehicle-internal sensor. A vehicle-internal sensor may be understood as a passive and/or active sensor on the vehicle. For example, the sensors may be radar sensors, image sensors, or laser sensors. Vehicle surroundings which may be directly sensed may be detected very precisely by vehicle-internal sensors. The information may also be made available for other vehicle functions.

Furthermore, the information may be ascertained using data of at least one foreign vehicle. Data of the foreign vehicle may be understood, for example, as a position report of the foreign vehicle and/or the data emitted by the foreign vehicle about the traffic density ascertained by the foreign vehicle. Since the host vehicle may emit the traffic density, it is also conceivable that it receives the traffic density of a foreign vehicle, which is equipped with a corresponding unit for detecting and transmitting the traffic density (for example, the density of another road section.) These data may then also be taken into consideration for the calculation of the control signal. The data of the foreign vehicle may also include ancillary items of information, such as a speed and travel direction of the foreign vehicle, surrounding conditions at the position of the foreign vehicle, a road status at the position or a distance information to other foreign vehicles. An enlarged space may be detected by the use of data of foreign vehicles. The foreign vehicles move on traffic areas. A space which is relevant for the traffic density may thus be monitored particularly reliably.

The method may also include a step of suspending the control command, which is executed in response to an entry of a further foreign vehicle into the illumination range. Dazzling of other road users may thus be avoided and/or the comfort of the driver of the host vehicle may simultaneously be increased, if the emission characteristic of the headlight is again switched back to the first emission characteristic in response to the suspension.

According to one particular specific embodiment of the present invention, in the step of ascertaining, an imminent entry of the vehicle into a curve is also ascertained, in the step of providing, the control command also being carried out using the ascertained imminent entry into the curve, in particular the control command being emitted in such a way that a maximum range to be illuminated by the at least one headlight on the roadway is reduced before the entry of the vehicle into the curve. Such a specific embodiment of the present invention offers the advantage of adaptation of the emission characteristic which is particularly comfortable for the driver, since in the case of a high traffic density, the probability of a vehicle appearing after the curve is greater than in the case of a lower traffic density. The driver of the vehicle would otherwise have to manually change the emission characteristic swiftly during or shortly after traveling through the curve, which means a sometimes significant stress for the driver, on the one hand, and may also mean endangerment of the traffic safety due to the distraction from the traffic events, on the other hand.

A computer program product having program code, which may be stored on a machine-readable carrier such as a semiconductor memory, a hard drive, or an optical memory, and which may be used to carry out the method according to one of the above-described specific embodiments when the program is executed on a computer or a device, is also advantageous.

The present invention will be explained in greater detail as an example hereafter on the basis of the appended drawings.

DETAILED DESCRIPTION OF THE INVENTION

Figure 1:
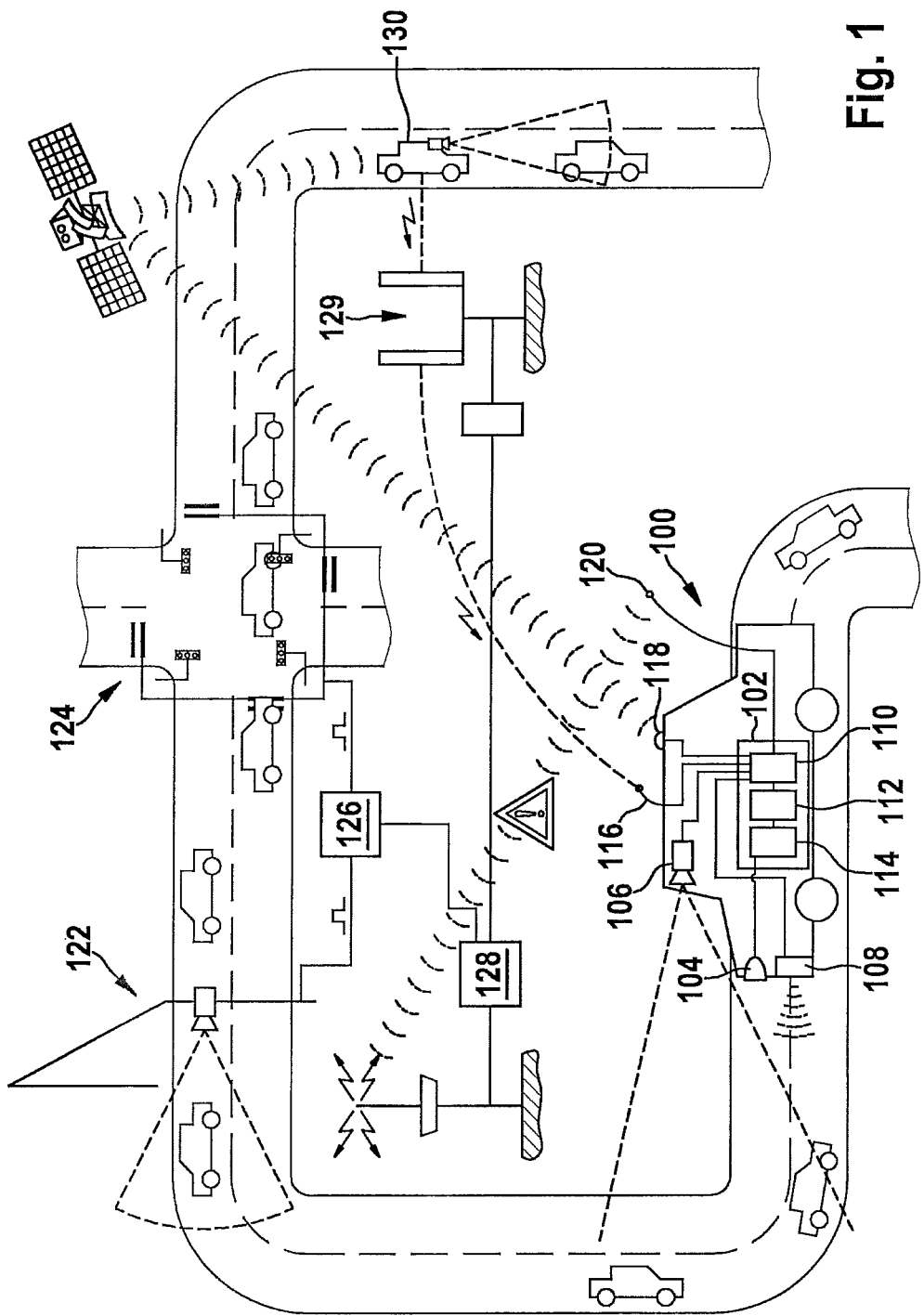
FIG. 1 shows an illustration of a vehicle having a control unit for activating at least one headlight of the vehicle according to one exemplary embodiment of the present invention.

In the following description of preferred exemplary embodiments of the present invention, identical or similar reference numerals are used for the elements which are shown in the various figures and act similarly, a repeated description of these elements being omitted.

FIG. 1 shows an illustration of a vehicle 100 having a control unit for activating 102 at least one headlight 104 of vehicle 100 according to one exemplary embodiment of the present invention. Vehicle 100 has a camera 106 and a radar device 108 as surroundings detection units. Vehicle 100 is located on a road. Surroundings detection units 106 and 108 provide items of information about road users in the surroundings of vehicle 104 for control unit 102. Control unit 102 has a unit for ascertaining 110, a unit for determining 112, and a unit for providing 114. Unit for ascertaining 110 is designed for the purpose of ascertaining a traffic density from the information about road users in the surroundings of vehicle 100. Unit for determining 112 is designed for the purpose, using the traffic density, of determining a control parameter for controlling an emission characteristic of the headlight, in response to the ascertained traffic density. Unit for providing 114 is designed for the purpose of carrying out a regulation of an emission characteristic of headlight 104 using the control parameter. In particular, the unit for determining may be designed for the purpose of determining a delay time. The delay time represents a time span by which a control command for headlight 104 is delayed, after an oncoming vehicle has left an illumination range of an emission characteristic of headlight 104. The delay time increases when the traffic density increases. Furthermore, unit for providing 114 may be designed for the purpose of waiting out the delay time after the oncoming vehicle has left the illumination range and subsequently providing the control command for headlight 104, so that headlight 104 may emit the emission characteristic "high beams."

Vehicle 100 also has a mobile radio antenna 116, via which control unit 102 may receive items of information. Control unit 102 may receive a present position of vehicle 100 via a GPS module 118. Control unit 102 may receive items of information from the radio traffic service, for example, via a radio antenna 120.

Further items of information about road users in the surroundings of vehicle 100 may come from sensors on road bridges 122, for example. Cameras and electronic sensors on road bridges 122 may ascertain a number of vehicles per unit of time and road section, for example. Inductive sensors 124, for example, at a road intersection, where inductive sensors 124 are used to control a traffic light, may also provide items of information about road users in the surroundings of vehicle 100. Items of information from infrastructure sensors, such as road bridge 122 and traffic lights 124, may be collected in a traffic control center 126. These items of information may be provided for multiple vehicles via a radio station 128. Radio station 128 may also supplement these items of information with personal items of information, which radio station 128 may receive directly from road users via a mobile communication network 129.

A foreign vehicle 130 may also have surroundings detection units. Foreign vehicle 130 may provide items of information of these surroundings detection units via mobile communication network 129 and mobile radio antenna 116 for control unit 102. The items of information may also be provided via a control center. Such items of information may be, for example, a distance of foreign vehicle 130 from a preceding vehicle, a position of foreign vehicle 130, the traffic density ascertained by the foreign vehicle, and/or weather conditions at a position of foreign vehicle 130.

Control unit 102 may ascertain the traffic density in the unit for ascertaining 110 from these items of information about road users in the surroundings of vehicle 100. The traffic density represents a probability of how rapidly it is to be expected that another vehicle will arrive in the illumination range of headlights 104. The unit for determining 112 may determine the delay time from the traffic density.

In other words, FIG. 1 describes a light system having an incorporation of the traffic situation or traffic density. The headlight may be turned off or adapted automatically. Function AHC (adaptive high-beam control) as a driver assistance system is an example. In the case of function AHC, the emission characteristic of the headlight of the host vehicle is adapted to the position of the foreign vehicle, so that the visibility range is increased, but another road user is not dazzled. In the case of a continuous setting, control parameters therefore also play a role, using which the dynamic response of the system is set. The system therefore detects other road users (vehicles) on the basis of their lights. If a vehicle should be discovered, the host vehicle's light (for example, high beams off) is adapted, so that the other vehicle is not dazzled. After the detected vehicle is no longer in the light range, the original status is restored after a defined time period. The traffic situation or traffic density may be incorporated in the definition of the time. For example, items of information from the radio traffic service, which are used in the navigation system for bypassing traffic jams, for example, may be used for an ascertainment of the traffic situation or traffic density. Also, C2X data (for example, the positions of road users 130), which are transmitted by all road users 130 and/or infrastructure transmitters, may also be used. Internet data from traffic pages may be read out by the control unit (navigation device or head unit). Data from surroundings sensor systems, such as radar 108, stereo camera systems 106, lidar, etc., of the host vehicle 100, and the road users ascertained therefrom may also be used. Camera 106 may have a column detection.

The traffic situation or traffic density may be taken into consideration during the setting of the time for restoring the original state. The system uses data for this purpose, which specify how the present traffic situation or traffic density is. The data are ascertained at least from the above-described sources in any possible combination, or weighted accordingly.

The higher the traffic density, the longer may the time be set until the original state is restored. The advantage of the system is that in the case of a high traffic density, the original state of the headlights is not immediately restored and then immediately canceled again, because the next vehicle travels into the host vehicle's light range. This allows a pleasant system for the driver and corresponds to the manual usage of the high beams. The traffic density may also be used for other parameter settings in the case of the light controller, not only for turning up the headlights again or for adapting at least one control parameter for adapting a dynamic response or speed during the change of the emission characteristic of the headlight. For example, preventive dimming may be activated before curves, since in the event of a high traffic density, a foreign vehicle appearing after the curve is to be expected with a higher probability than would be expected in the case of lower traffic density. By way of the early precautionary, i.e., preventive, dimming before a curve, the comfort for the driver may be increased, since the driver may be prevented from having to carry out dimming swiftly during or after negotiating the curve and therefore also being able to direct less attention to the traffic events.

Figure 2:
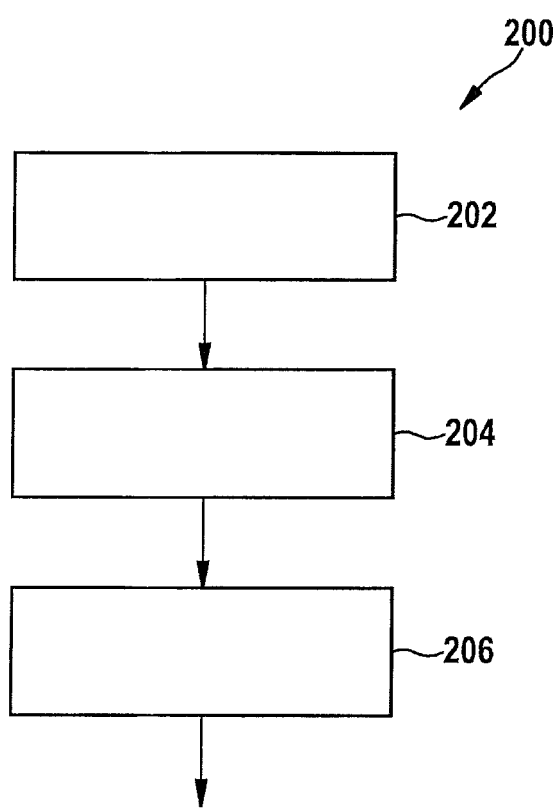
FIG. 2 shows a flow chart of a method for activating at least one headlight of a vehicle according to one exemplary embodiment of the present invention.

FIG. 2 shows a flow chart of a method 200 for activating at least one headlight of a vehicle according to one exemplary embodiment of the present invention. Method 200 has a step of ascertaining 202, a step of determining 204, and a step of providing 206. In the step of ascertaining 202, a traffic density is ascertained from an item of information about road users in the surroundings of the vehicle. In the step of determining 204, at least one control parameter for controlling an emission characteristic of the headlight is determined in response to the ascertained traffic density. In the step of providing 206, the control command for controlling an emission characteristic of the headlight is provided using the control parameter.

The exemplary embodiments which are described and shown in the figures are only selected as examples. Different exemplary embodiments may be combined with one another completely or with respect to individual features. One exemplary embodiment may also be supplemented by features of another exemplary embodiment.

Furthermore, method steps according to the present invention may be executed repeatedly and in a sequence different than that described.

What is claimed is:

1. A method for activating at least one headlight of a host vehicle, comprising:
   ascertaining a traffic density in a surrounding of the host vehicle from an item of information relating to traffic conditions in the surrounding of the host vehicle;
   determining a switching frequency of an emission characteristic of the headlight using the ascertained traffic density, wherein the switching frequency is decreased as the traffic density increases, and wherein the emission characteristic includes at least three different emission characteristics;
   determining a control command for controlling the emission characteristic of the headlight to transition between the at least three different emission characteristics at the switching frequency; and
   providing the control command to the headlight.

2. The method as recited in claim 1, wherein the item of information is detected by a sensor which is placed off-board the host vehicle.

3. The method as recited in claim 1, wherein the item of information is detected by a sensor which is placed on-board the host vehicle.

4. The method as recited in claim 1, wherein the item of information is ascertained using data provided by road users in the surrounding of the host vehicle.

5. The method as recited in claim 1, further comprising:
   ascertaining an imminent entry of the vehicle into a curve of a roadway
   wherein the control command is determined so that a maximum range to be illuminated by the at least one headlight on the roadway is reduced before the entry of the vehicle into the curve.

6. A control unit for activating at least one headlight of a vehicle, comprising: processing circuitry for:
   ascertaining a traffic density in a surrounding of the host vehicle from an item of information relating to traffic conditions in the surrounding of the host vehicle;
   determining a switching frequency of an emission characteristic of the headlight using the ascertained traffic density, wherein the switching frequency is decreased as the traffic density increases, and wherein the emission characteristic includes at least three different emission characteristics; and
   determining a control command for controlling the emission characteristic of the headlight to transition between the at least three different emission characteristics at the switching frequency; and
an output unit for providing the control command to the headlight.

7. A non-transitory computer-readable data storage medium storing a computer program having program codes which, when executed on a computer, perform a method for activating at least one headlight of a host vehicle, the method comprising:
   ascertaining a traffic density in a surrounding of the host vehicle from an item of information relating to traffic conditions in the surrounding of the host vehicle;
   determining a switching frequency of an emission characteristic of the headlight using the ascertained traffic density, wherein the switching frequency is decreased as the traffic density increases, and wherein the emission characteristic includes at least three different emission characteristics;
   determining a control command for controlling the emission characteristic of the headlight to transition between the at least three different emission characteristics at the switching frequency; and
   providing the control command to the headlight.

* * * * *